United States Patent [19]

Lisec

[11] 4,369,084

[45] Jan. 18, 1983

[54] APPARATUS FOR PRODUCING INSULATING GLASS FILLED WITH A GAS OTHER THAN AIR

[76] Inventor: Peter Lisec, Behnhofstrasse 34, Amstetten-Hausmening (Niederosterreich), Austria

[21] Appl. No.: 313,188

[22] Filed: Oct. 20, 1981

[30] Foreign Application Priority Data

May 26, 1981 [AT] Austria ................................ 2364/81

[51] Int. Cl.$^{3}$ .............................................. C03C 27/00

[52] U.S. Cl. .................................... 156/382; 156/107; 156/109; 156/286; 156/358; 156/580

[58] Field of Search ................. 156/87, 382, 104, 107, 156/109, 580, 583.1, 285, 286, 358, 378

[56] References Cited

U.S. PATENT DOCUMENTS 3,683,974 8/1972 Stewart .......................... 156/109 X

*Primary Examiner*—David A. Simmons

*Attorney, Agent, or Firm*—Young & Thompson

[57] ABSTRACT

Apparatus for producing insulating glass filled with a gas other than air, such as sulfur hexafluoride, comprising two substantially vertical plates disposed on opposite sides of the insulating glass to be filled. At least one of said plates is displaceable transversely to said plate. Sealing elements are associated with the top horizontal edges and the vertical side edges of said plates. A tub-like container is provided below the plates and has a liftable bottom and an opening that is connected and sealed to the plates.

18 Claims, 1 Drawing Figure

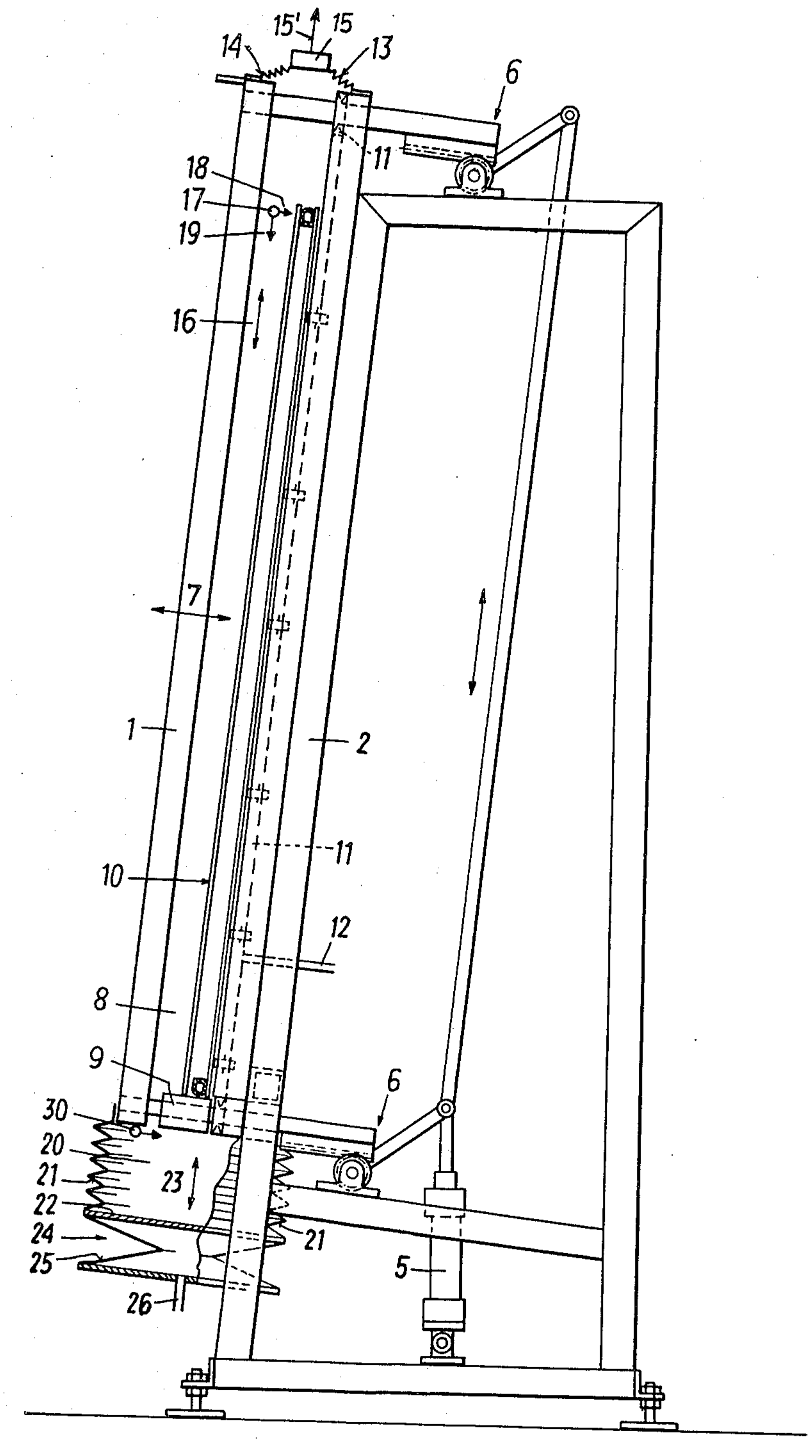
15'
15
14
13
6
11
18
17
19
16
7
1
2
11
10
12
8
9
6
30
20
21
22
23
24
25
26
21
5

APPARATUS FOR PRODUCING INSULATING GLASS FILLED WITH A GAS OTHER THAN AIR

This invention relates to apparatus for producing insulating glass filled with a gas other than air such as sulfur hexafluoride, from uncompacted insulating glass comprising two substantially vertical plates disposed on opposite sides of the insulating glass to be filled with the gas, e.g., platens operable to compact insulating glass, at least one of which plates is displaceable transversely to its plane.

To fill insulating glass with heavy gas, narrow tubes were previously used, which were introduced into the interior of insulating glass through holes in the spacer frame of compacted insulating glass. The heavy gas was injected through said tubes under pressure and at a high velocity of flow. That known operation is not desirable because holes are required which when the glass has been filled with heavy gas must be sealed in a troublesome operation and because the insulating glass cannot be completely filled with heavy gas within a reasonable time but a mixture of heavy gas and at least 30% air usually results. It is an object of the invention to provide apparatus which is of the kind described first hereinbefore and which permits a fast and complete filling of insulating glass panels with a gas other than air.

In accordance with the invention the apparatus is characterized in that sealing elements are associated with the top horizontal edge and the two substantially vertical edges of said plates, said sealing elements are extensible to a sealing position, a horizontally elongated tublike container for holding a gas other than air is disposed under the plates and has at its top an opening defined by edges which are connected and sealed to the plates, and a device for lifting the bottom of the tublike container is associated with said bottom.

In the apparatus according to the invention, the large gas exchange opening which is available in uncompacted insulating glass, e.g., in insulating glass which is still open at its bottom edge, is utilized in an advantageous manner.

Further features and details of the invention will become apparent from the following description of an illustrative embodiment of the apparatus according to the invention shown on the accompanying drawing in a diagrammatic side elevation.

The apparatus comprises two parallel plates 1 and 2, which are substantially vertical and are preferably slightly inclined from the vertical, e.g., by 5 degrees. As is shown on the drawing, these plates 1 and 2 may be constituted by the platens of a surface-pressing press for compacting insulating glass. In the embodiment shown by way of example, the plate 2 is stationary and secured to carriers and the plate 1 is displaceable in the direction of the double arrow 7 by way of fluid-operable cylinders 5 and rack-and-pinion drives 6.

Driven conveyor rollers 9 are provided on the underside of the stationary plate 2 below the space 8 between the plates 1 and 2 and are rotatable on substantially horizontal axes. Insulating glass panels 10 are conveyed on these conveyor rollers 9 along the stationary plate 2 into the space 8.

Sealing elements 11 are provided adjacent to the substantially vertical edges of the plate 2 and in position of rest are arranged in recesses in the plate 2. The sealing elements 11 consist of a flexible tubular member having longitudinal folds and through ducts 12 may be supplied with pressure fluid to extend the sealing elements to their sealing position, in which they engage opposite edges of the plate 1, and may be evacuated so that they are retracted to their position of rest shown on the drawing. Alternatively, sealing elements corresponding to the sealing elements 11 may be arranged also in the movable plate 1 and the two opposite sealing elements may be inflated until they engage each other and seal the space 8.

The space 8 is closed at the top by two webs 13, which are tightly joined to plates 1 and 2, respectively, and have folds 14 and are also tightly joined to a bar 15 provided between the webs 13. At least one conduit 15′ is provided, which extends, e.g., from the bar 15 and through which air can be sucked from the space 8 so that a slight vacuum is established in the space 8 in order to prevent a mixing of air with the heavy gas. An electronic speed control system is associated with the suction fan and ensures that the vacuum will remain constant even as the plate 1 approaches the plate 2.

The space 8 contains a measuring device 17, which is movable up and down along the double-headed arrow 16 and comprises a sensor, symbolized by the arrow 18, for detecting the top edge of the insulating glass panel 10, and a sensor 19, e.g., an instrument for measuring the oxygen content, so that the heavy gas-air interface can be detected.

A horizontally elongated container 20 is provided below the plates 1 and 2 and has bellowslike side walls 21, which are connected and sealed to the lower ends of plates 1 and 2. The bottom member 22 of the container consists in the illustrative embodiment of a rigid plate and can be lifted and lowered by a device 24 in the directions indicated by the arrow 23. In the embodiment shown by way of example, the device 24 is a mechanical device 25, 26, by which the bottom member 22 of the container 20 can be lifted and lowered in an exactly controlled manner. The heavy gas is quickly sucked back into the container 20 as the bottom 22 is lowered.

To fill an insulating glass which has not yet been compacted and which, as shown by way of example on the drawing, is still open along a lower edge resting on the conveyor rollers 9, the apparatus according to the invention is operated as follows.

The uncompacted insulating glass 10 is conveyed on the conveyor rollers 9 into the space 8 between the two plates 1 and 2. The end position of the insulating glass may be defined by a limit stop, not shown. As soon as the insulating glass has reached its end position, the plate 1 is approached to the plate 2 so that the space 8 is minimized, and the sealing elements 11 are extended until they engage the plate 1 on the surface facing the plate 2 so that the space 8 is sealed. Then the measuring device 17 is raised to a position in which its sensor 18 is disposed on the level of the top edge of the insulating glass 10. The lifting device 24 is then operated to lift the bottom member 22 of the container 20, which is filled with heavy gas, and air is sucked through conduit 15′ from the space 8 at the same time. As a result, the interface between the air (at the top) and the heavy gas (underneath) rises gradually until it reaches the sensor 19 of the measuring device 17. As soon as the interface has reached the sensor 19, which senses, e.g., the gas density or the oxygen content, the plate 1 is further advanced toward the plate 2 and the insulating glass 10 that has now been filled with heavy gas is compacted.

When the compacting operation has been terminated, the bottom member 22 of the container 20 is lowered and air is admitted from above into the space 8. When this operation has been terminated, the sealing elements 11 are retracted to their position of rest and the insulating glass which has been filled with heavy gas and compacted may then be removed from the apparatus by means of the conveyor rollers 9.

Another sensor 30, which is stationary, is provided adjacent to the top opening of the container 20 and serves also to measure the oxygen content of the surrounding gas. That sensor 30 is used to control the lowering of the bottom member 22 of the container 20 and to initiate the making up of the supply of heavy gas in the container when the quantity of heavy gas in the container has decreased below a predetermined value.

By means of the apparatus according to the invention insulating glass panels consisting of two or more panes can be filled with heavy gas, with a maximum air content of 5%, in small cycle times. As contrasted therewith, it was not possible to achieve air contents below 30% within reasonable cycle times where the conventional narrow tubes were employed.

The use of the apparatus according to the invention is not restricted to the filling of insulating glass with gases that are heavier than air but includes the filling of insulating glasses with any gas or gas mixture.

What is claimed is:

1. In apparatus for producing insulating glass filled with a gas from uncompacted insulating glass, comprising two substantially vertical planar plates, which are horizontally spaced apart to define between them a space adapted to receive uncompacted insulating glass, at least one of said plates being displaceable transversely to its plane relative to the other of said plates, each of said plates having a top horizontal edge and two substantially vertical edges, which edges are aligned with corresponding edges of the other of said plates, the improvement residing in that sealing elements are associated with the top horizontal edges and each pair of corresponding substantially vertical edges of said plates, each of said sealing elements is retractable to a non-sealing position and extensible to a sealing position and adapted to seal said space at said corresponding edges in said sealing position, a horizontally elongated container is disposed under said plates and has a top rim, which is connected and sealed to said plates and defines an opening communicating with said space between said plates, said container has a bottom member that is adapted to be lifted toward and lowered from said rim, and lifting means are provided, which are operable to lift and lower said bottom member.

2. The improvement set forth in claim 1, wherein said container has bellowslike side walls.

3. The improvement set forth in claim 1, wherein said bottom member consists of a rigid bottom plate and said lifting means is connected to said bottom plate.

4. The improvement set forth in claim 3, wherein said lifting means is a mechanical lifting device.

5. The improvement set forth in claim 1, wherein said sealing elements associated with the substantially vertical edges of said plates consist of flexible tubes and means are provided for supplying a pressure fluid to said tubes to inflate them from said position of rest to said sealing position.

6. The improvement set forth in claim 5, wherein said flexible tubes have longitudinal folds.

7. The improvement set forth in claim 5, wherein each of said sealing elements associated with said substantially vertical edges consists of a flexible tube which is connected to one of said plates and adapted to be inflated into engagement with the other of said plates.

8. The improvement set forth in claim 1, wherein said sealing element associated with said top horizontal edges consists of a cover plate, which is hinged to one of said plates and rests on the top horizontal edge of the other of said plates, and suction conduits for sucking air from said space between said plates communicate through said cover plate with said space between said plates.

9. The improvement set forth in claim 8, wherein said cover plate has a sealing rubber lip resting on the top horizontal edge of said other plate.

10. The improvement set forth in claim 1, as applied to apparatus for filling said insulating glass with a heavy gas that is heavier than air, wherein a measuring device is provided in said space between said plates and adapted to be moved up and down in said space and to detect the level of the top edge of an insulating glass disposed in said space, a sensor is associated with said measuring device and adapted to detect an interface between air and heavy gas in said space, said sensor being adapted to interrupt the lifting of said bottom member when said interface has been raised to the top horizontal edge of said insulating glass.

11. The improvement set forth in claim 10, wherein said sensor is adapted to measure the gas density in said space between said plates.

12. The improvement set forth in claim 10, wherein said sensor is adapted to measure the oxygen content of the gas in said space between said plates.

13. The improvement set forth in claim 10 as applied to apparatus comprising conveyor means for conveying an insulating glass panel filled with heavy gas out of the space between said plates and displacing means for moving said plates horizontally toward and away from each other, wherein said sensor is adapted to cause said sealing elements associated with said substantially vertical edges of said plates to be retracted from said sealing position to said non-sealing position, to cause said displacing means to move said plates horizontally away from each other, and subsequently to cause said conveyor means to move said insulating glass panel out of said space between said plates.

14. The improvement set forth in claim 13, which comprises a timer for controlling the timing of the retracting of said substantially vertical edges of said plates from said sealing position to said non-sealing position, the operation of said displacing means to move said plates horizontally away from each other, and the operation of said conveyor means to move said insulating glass panel out of said space between said plates.

15. The improvement set forth in claim 1, wherein a sensor adapted to measure the oxygen content of the gas surrounding said sensor is provided adjacent to said opening of said container.

16. The improvement set forth in claim 1, wherein said plates are operable to compact said insulating glass in said space.

17. The improvement set forth in claim 16, as applied to apparatus for filling said insulating glass with a heavy gas that is heavier than air, comprising displacing means for moving said plates horizontally away from each other and toward each other sufficiently to compact said insulating glass in said space between said plates, wherein a measuring device is provided in said space between said plates and adapted to be moved up and down in said space and to detect the level of the top edge of an insulating glass disposed in said space, a sensor is associated with said measuring device and adapted to detect an interface between air and heavy gas in said space, said sensor being adapted to interrupt the lifting of said bottom member and the operation of said displacing means to compact said insulating glass in said space between said plates when said interface has been raised to the top horizontal edge of said insulating glass.

18. The improvement set forth in claim 1, wherein said sealing element associated with said top horizontal edges consists of two webs, which are tightly joined to respective ones of said plates and have folds, and a bar disposed between and tightly joined to said webs, and a suction conduit communicating through said bar with said space between said plates extends from said bar and is adapted to suck air from said space.

* * * * *